(12) United States Patent
Kerestes et al.

(10) Patent No.: US 12,736,947 B2
(45) Date of Patent: Sep. 15, 2026

(54) OPERATOR ASSIST TOOL CART

(71) Applicant: The Boeing Company, Arlington, VA (US)

(72) Inventors: Jason Andrew Kerestes, Phoenix, AZ (US); Ashley Susan Rook, North Charleston, SC (US); Kimberly-Alice Dendramis Gregersen, Seattle, WA (US); Akunnaya Onubogu, Charleston, SC (US)

(73) Assignee: The Boeing Company, Arlington, VA (US)

( * ) Notice: Subject to any disclaimer, the term of this patent is extended or adjusted under 35 U.S.C. 154(b) by 358 days.

(21) Appl. No.: 18/545,431

(22) Filed: Dec. 19, 2023

(65) Prior Publication Data

US 2025/0199511 A1 Jun. 19, 2025

(51) Int. Cl.

*B23K 37/02* (2006.01)
*B23K 26/36* (2014.01)
*B62D 63/04* (2006.01)
*G05B 19/4155* (2006.01)

(52) U.S. Cl.

CPC .......... *G05B 19/4155* (2013.01); *B23K 26/36* (2013.01); *B23K 37/0294* (2013.01); *B62D 63/04* (2013.01); *G05B 2219/45165* (2013.01)

(58) Field of Classification Search

USPC .......................................................... 700/166
See application file for complete search history.

(56) References Cited

U.S. PATENT DOCUMENTS

2012/0116583 A1* 5/2012 Beard .................. B62D 55/202 901/44
2014/0263934 A1* 9/2014 Buttrick, Jr. ............. F16M 3/00 248/647
2021/0030245 A1* 2/2021 Kim ...................... A47L 11/282
2022/0066456 A1* 3/2022 Ebrahimi Afrouzi ........................ G06F 3/04883
2022/0274206 A1* 9/2022 Tyson, II ............. G01B 11/165
2023/0001460 A1* 1/2023 Lee ........................ B23K 26/03
2023/0133525 A1* 5/2023 Izadi ..................... B62B 5/0043 180/14.2

FOREIGN PATENT DOCUMENTS

CN 108480847 A * 9/2018 ............. B23K 26/36

* cited by examiner

*Primary Examiner* — Emilio J Saavedra
(74) *Attorney, Agent, or Firm* — Yee & Associates, P.C.

(57) ABSTRACT

A motorized utility cart designed to assist in the precision operation of various handheld tools. In one embodiment, the cart is equipped with four wheels, a motor, and a drive mechanism that propels the cart forward or backward at user-defined speeds. The resulting consistent movement speed is advantageous for tools where speed consistency directly impacts performance. A user interface allows for speed selection and control. Initially developed to aid in handheld laser ablation for paint removal, its design versatility extends to various other applications.

20 Claims, 12 Drawing Sheets

OPERATOR ASSIST TOOL CART

BACKGROUND INFORMATION

1. Field

The present disclosure relates generally to operator assist tool carts and operator assist tool cart methodologies, more specifically to operator assist surface treatment tool carts and methodologies, and in particular to operator assist laser ablation tool carts for paint removal and associated methodologies.

2. Background

Often surface treatment tools are hand-held with inherent drawbacks. For instance, stability of the tool with regard to the surface. In particular, orientational stability and velocity stability.

When done by hand the sanding process is slow and presents ergonomic challenges for operators. Further, operators must also wear a significant amount of PPE to protect them from the process.

Stand-alone handheld lasers have some ergonomic improvements over hand sanding and can remove certain coatings more quickly than by hand sanding, but can be tiring when depressing the trigger for the ablation of a large part. Also, quality of the surface is dependent on operator control of translation speed.

Another issue is that hand sanding requires skilled labor to minimize the risk of damage to the underlying surface material. Skilled labor is expensive when all costs are considered. Consequently, hand sanding is expensive. In addition, ergonomic injuries are also costly not only to the person injured, but also as a result of consequential worker's compensation that ensues.

One previous approach to improving surface treatment is full automation of the tools. However, this is a capital intensive approach and involves additional high cost issues such as maintaining and repairing the complex equipment required by full automation. This can render full automation more expensive than the hand-held approach. Other unresolved issues are lack of portability of the full automation equipment.

Therefore, it would be desirable to have a surface treatment tool, as well as methods of using that tool that take into account at least some of the issues discussed above, as well as other possible issues.

SUMMARY

There is a need for the following embodiments of the present disclosure. Of course, the present disclosure is not limited to these embodiments.

Some handheld tools are suitable for surface treatment of structural parts. These handheld tools would benefit from better control, but there are factors, such as cost and lack of portability, inhibiting commercial implementation of fully automated system approaches.

For instance, some lasers are suitable for surface treatment of large structural aircraft parts. An embodiment of the present disclosure provides a guide cart to better control a handheld laser without going to a fully automated solution. An embodiment can include a guide cart which accepts a handheld laser head with the guide cart having variable controlled speed options. Such an embodiment can include an attached pin to facilitate laser trigger actuation. Optionally, a control system of the cart can control actuation of the trigger. In general, embodiments of the present disclosure are much smaller and less expensive compared to fully automated approaches.

An embodiment of the present disclosure provides a method comprising: providing a cart comprising a control system, at least three wheels and a set of motors connected to the at least three wheels, the at least three wheels configured to contact a surface, the set of motors configured to rotate at least one of the at least three wheels and propel the cart across the surface; controlling a direction of the cart using the control system; controlling activation of at least one of the set of motors using the control system comprising propelling the cart across the surface; and controlling a traversal speed of the cart across the surface using the control system.

Another embodiment of the present disclosure provides a method comprising: providing a cart comprising a control system, a laser, four wheels and a set of motors connected to the four wheels, the four wheels configured to contact a surface, the set of motors configured to rotate at least one of the four wheels and propel the cart across the surface; controlling a direction of the cart using the control system; controlling activation of at least one of the set of motors using the control system comprising propelling the cart across the surface; and controlling a traversal speed of the cart across the surface using the control system.

Another embodiment of the present disclosure provides an apparatus comprising: a cart comprising at least three wheels and a set of motors connected to the at least three wheels, with at least three wheels configured to contact a surface, the set of motors configured to rotate at least one of the at least three wheels and propel the cart across the surface; a tool coupled to the cart, the tool configured to affect the surface; and a control system coupled to the cart, wherein the control system controls a cart direction, activation of at least one of the set of motors, and cart speed relative to the surface.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Embodiments presented in the present disclosure and the various features and advantageous details thereof are explained more fully with reference to the nonlimiting embodiments that are illustrated in the accompanying drawings and detailed in the following description. Descriptions of well known materials, techniques, components and equipment are omitted so as not to unnecessarily obscure the embodiments of the present disclosure in detail. It should be understood, however, that the detailed description and the specific examples are given by way of illustration only and not by way of limitation. Various substitutions, modifications, additions and/or rearrangements within the scope of the underlying inventive concept will become apparent to those skilled in the art from this disclosure.

An embodiment of this disclosure includes an operator assist tool cart. In this embodiment, the cart is compact, made using 3D printing technology, ensuring lightweight and durability. It features a stepper motor connected to a belt drive, which powers two of the four wheels. This setup provides precise control over the cart's movement in a linear fashion.

An embodiment of this disclosure includes a control system. In this embodiment, a microcontroller forms the brain of the system, interfacing with a user interface panel. This panel allows operators to set and adjust the speed as per their requirements, ensuring a steady pace suitable for the task at hand.

An embodiment of this disclosure can be configured for a primary application, for example, laser ablation tasks, such as paint removal, in which maintaining a consistent speed is crucial. Moving too fast may result in incomplete paint removal, while too slow a movement can damage the substrate and/or unnecessarily increase processing time. This cart automates the movement, ensuring optimal speed for effective and safe laser ablation.

Figure 1:
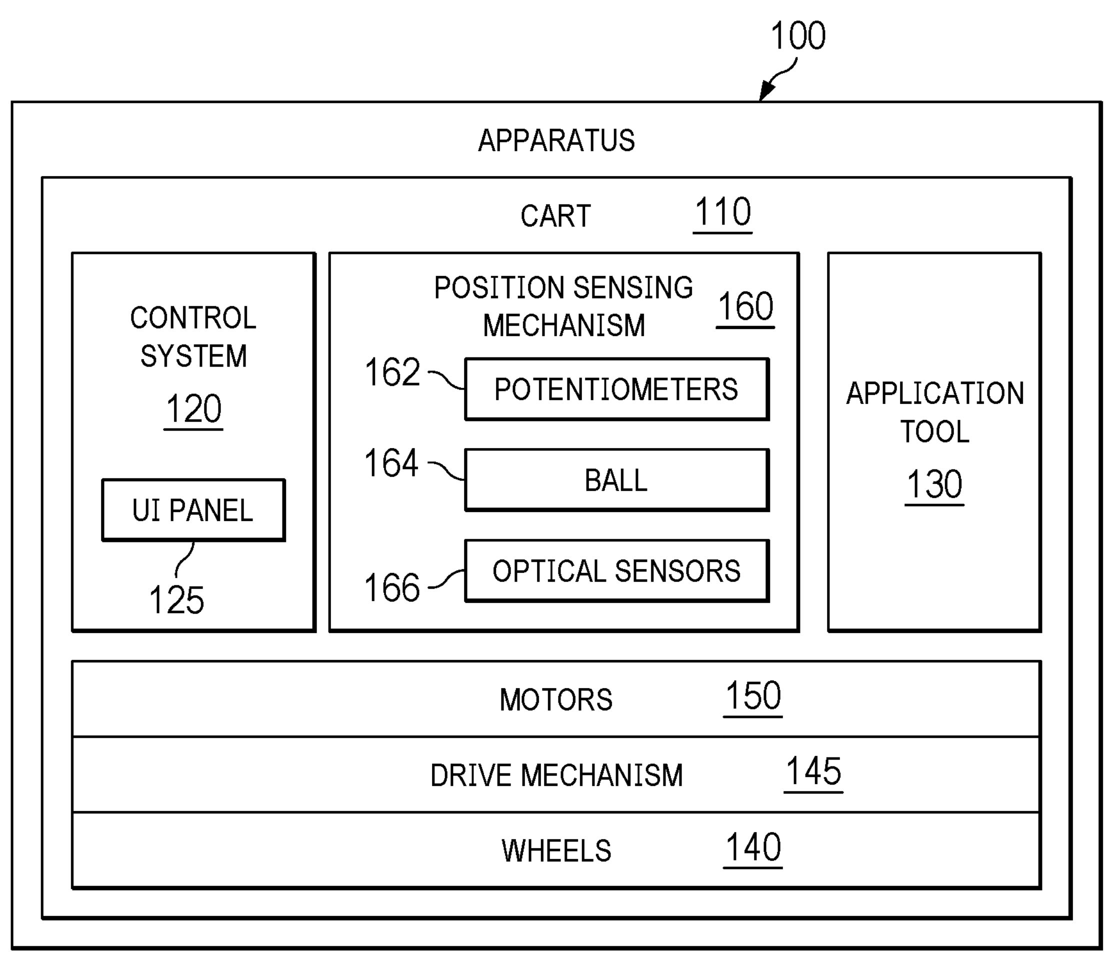
FIG. 1 is an illustration of a block diagram of an apparatus comprising an operator assist tool cart in accordance with an illustrative embodiment.

Turning now to FIG. 1, an illustration of a block diagram of an operator assist tool 100 is depicted in accordance with an illustrative embodiment. The operator assist tool 100 comprises a cart 110. The cart 110 includes a control system 120. The control system 120 includes a user interface panel 125. The cart includes an application tool 130. The cart 110 includes a set of wheels 140. The set of wheels are configured to support the cart upon a surface. The cart includes a set of motors 150 coupled to the set of wheels 140. The set of motors are configured to rotate the set of wheels and propel the cart across the surface. The cart includes a drive mechanism coupled between the set of motors and the set of wheels. The cart includes a position sensing mechanism 160 to sense movement of the cart relative to the surface and provide scalar displacement data to the control system. The position sensing mechanism 160 can include a set of potentiometers 162. The position sensing mechanism 160 can include a roller ball. The position sensing mechanism 160 can include an optical sensor 166.

Figure 2A:
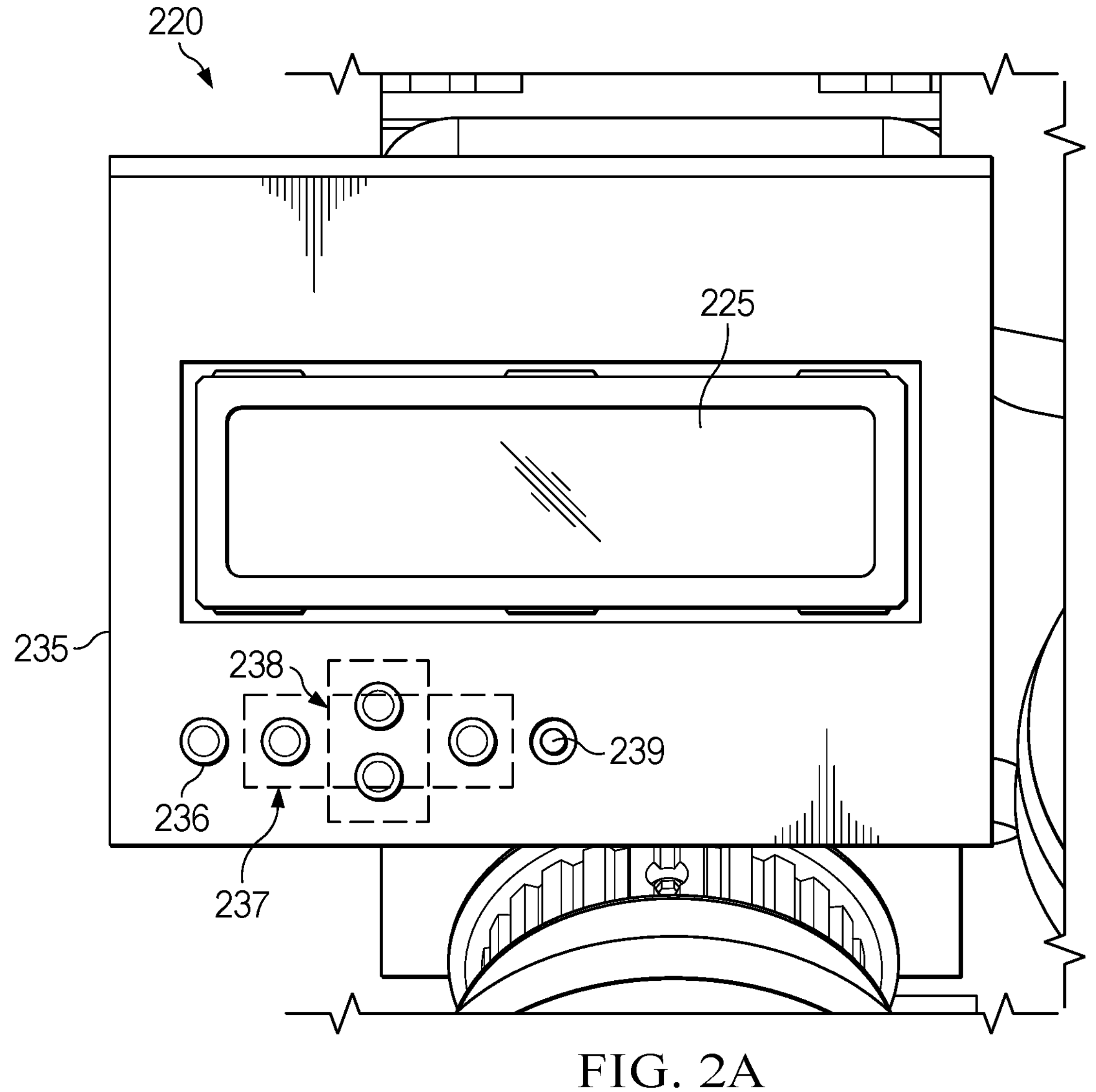
FIG. 2A is an illustration of a portion of an operator assist tool cart in accordance with an illustrative embodiment.
Figure 2B:
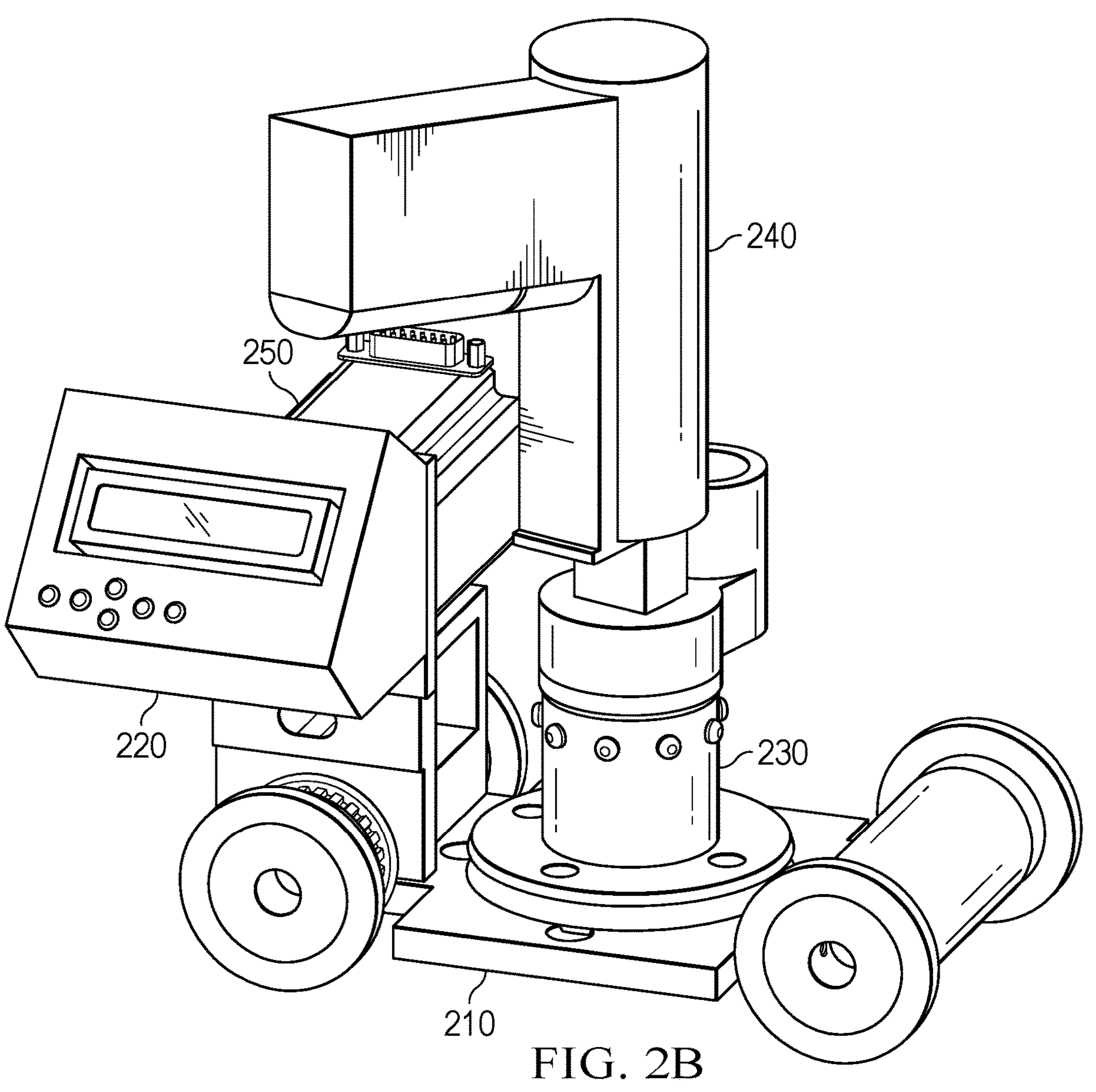
FIG. 2B is an illustration of the operator assist tool cart without the drive belt in accordance with an illustrative embodiment.

Turning to FIGS. 2A-2B, views of a guide cart with variable speed options to better control a handheld laser without going to a fully automated solution are illustrated. Cart 210 includes a control system 220. In this illustrated embodiment tool 230 is a handheld laser 235. Suitable handheld lasers are a readily commercially available product from General Lasertronics Corporation, Adapt, and/or Clean Laser. The handheld laser from General Lasertronics includes an IPG Photonics (Oxford, MA, USA) laser integrated into the General Lasertronics handheld tool. The laser can be mounted vertically upon an adaptor mounted on a top of a base of the cart. Additional features can include features to enable more autonomous operation.

FIG. 2A illustrates a close-up view of a user interface panel 235 of the control system 220. The user interface panel 235 includes a screen 225 and a mode select control 236. The user interface panel 235 includes a left/right control 237. The user interface panel 235 includes a speed+/speed− control 238. The user interface panel also includes a reset control 239. FIG. 2B illustrates a wider view of cart 210 supported on the surface. Cart 210 includes control system 220, adaptor 230, and laser 240. In this embodiment, 2 of the set of wheels are driven by a set of motors 250.

Figure 3:
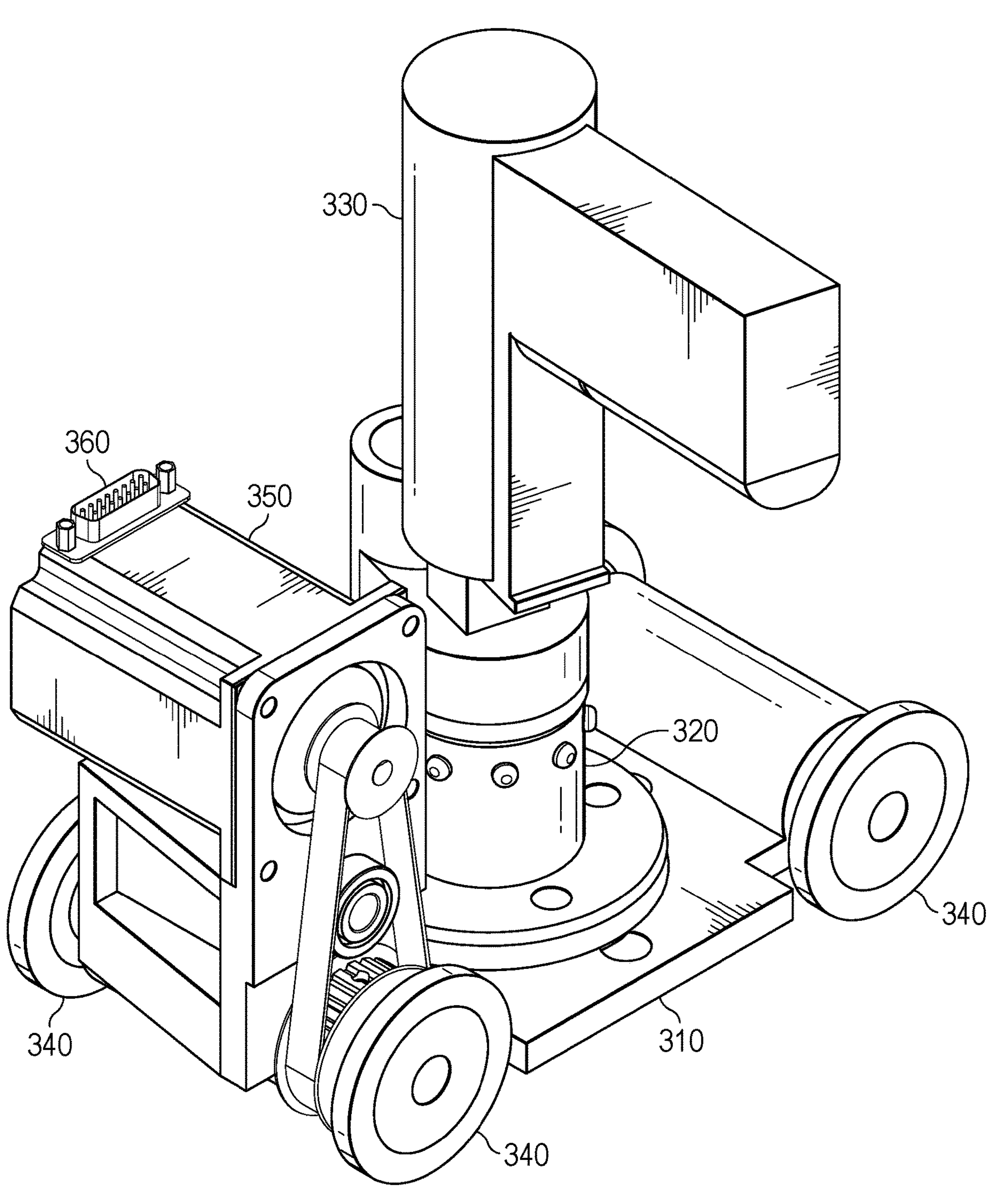
FIG. 3 is an illustration of the operator assist tool cart without the control system in accordance with an illustrative embodiment.

Turning to FIG. 3, in this particular embodiment, the cart 310 includes a set of four wheels 340, and a set of 1 electric motor 350. There is an adaptor 320 coupled between tool 330 and the base of the cart 310. There is a communication port 360 for control purposes coupled to the set of 1 electric motor 350.

Figure 4:
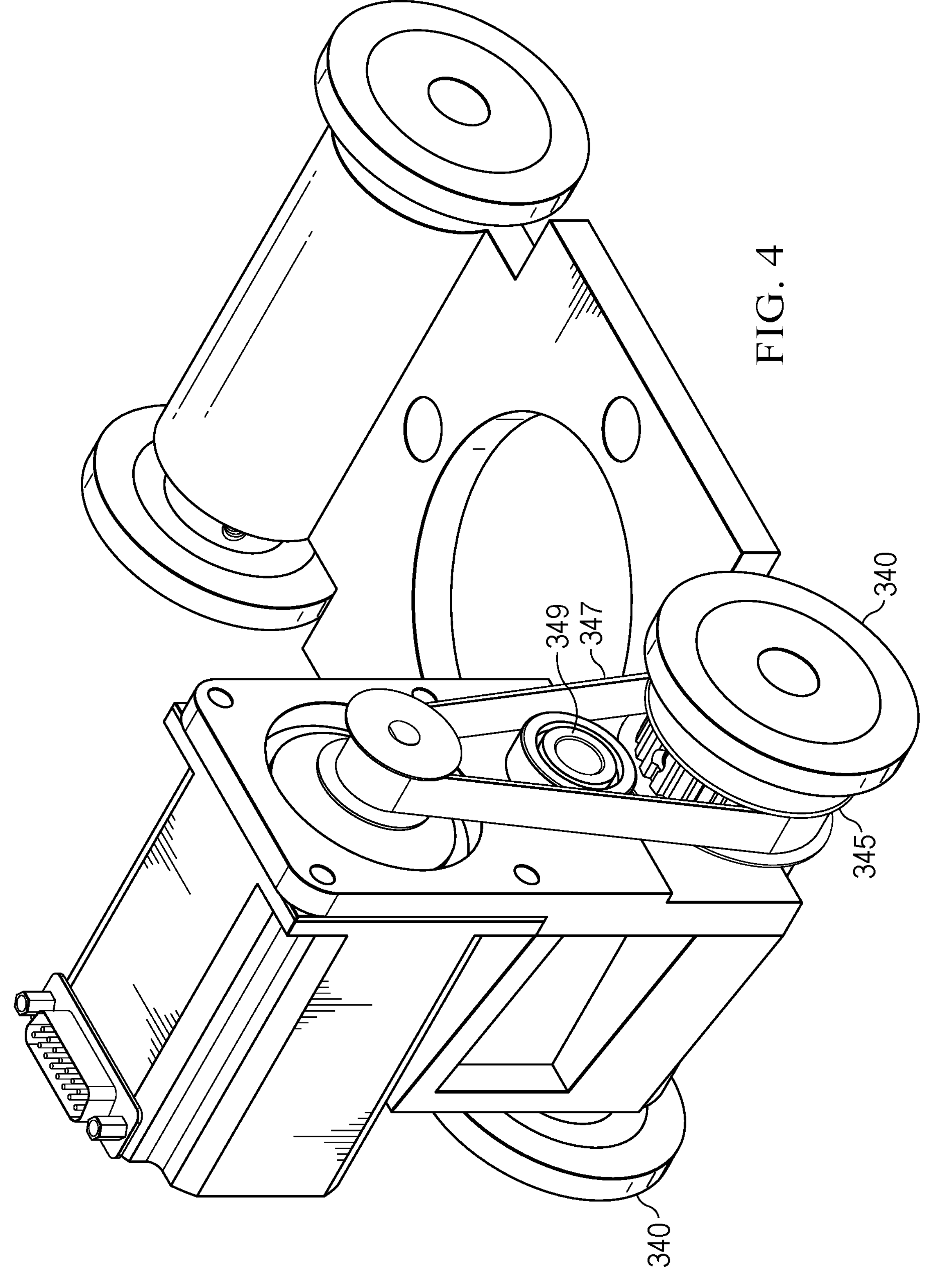
FIG. 4 is an illustration of the operator assist tool cart without the laser or the control system in accordance with an illustrative embodiment.

Turning to FIG. 4, in this embodiment drive mechanism 345 is coupled between 2 of the set of four wheels 340 and the set of 1 electric motor 350. In this particular embodiment, the drive mechanism 345 includes a drive belt 347. The drive mechanism also includes an idler wheel 349 to stabilize the drive belt.

Figure 5:
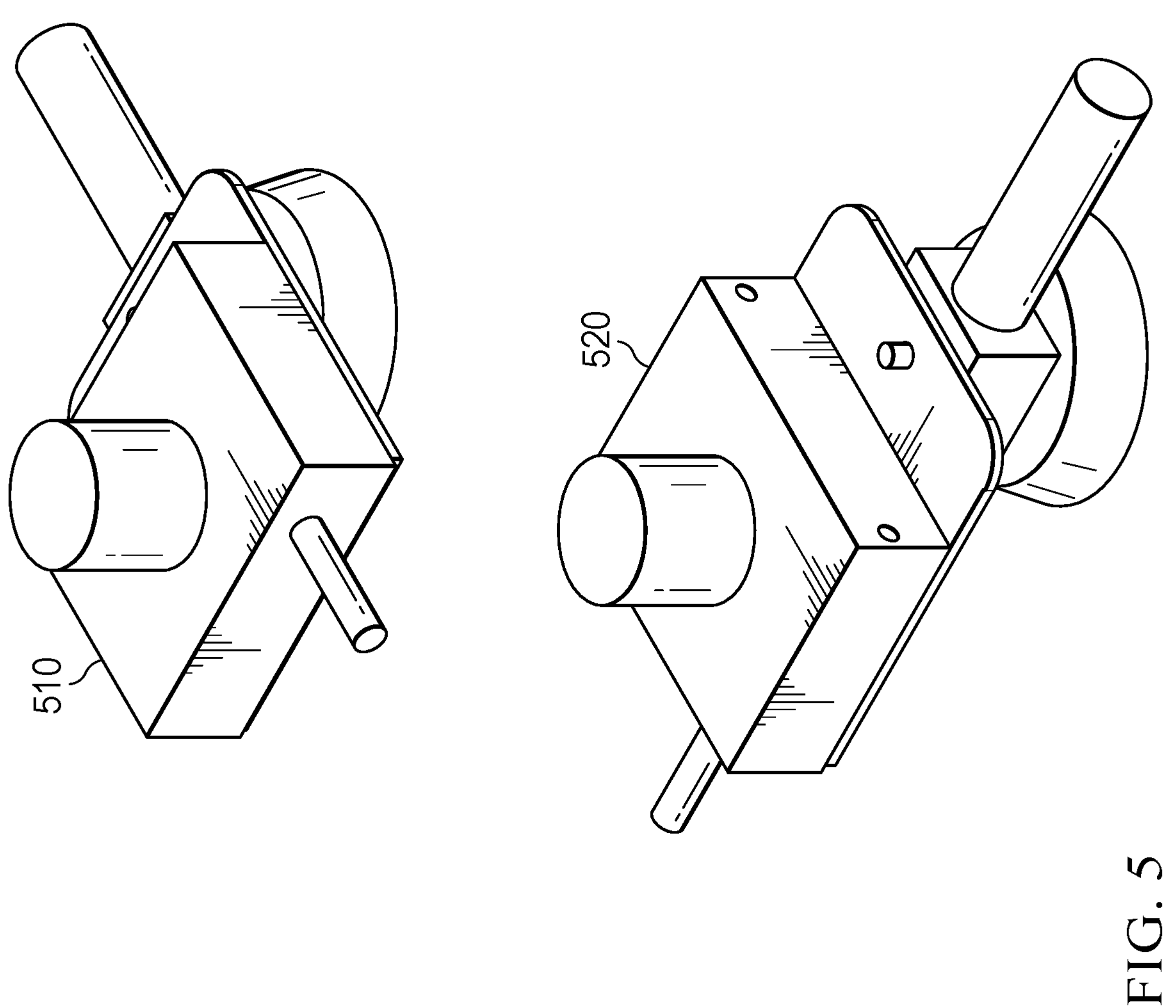
FIG. 5 is an illustration of a portion of the operator assist tool cart together with a set of string potentiometers that provide scalar displacement data in accordance with an illustrative embodiment.
Figure 5:
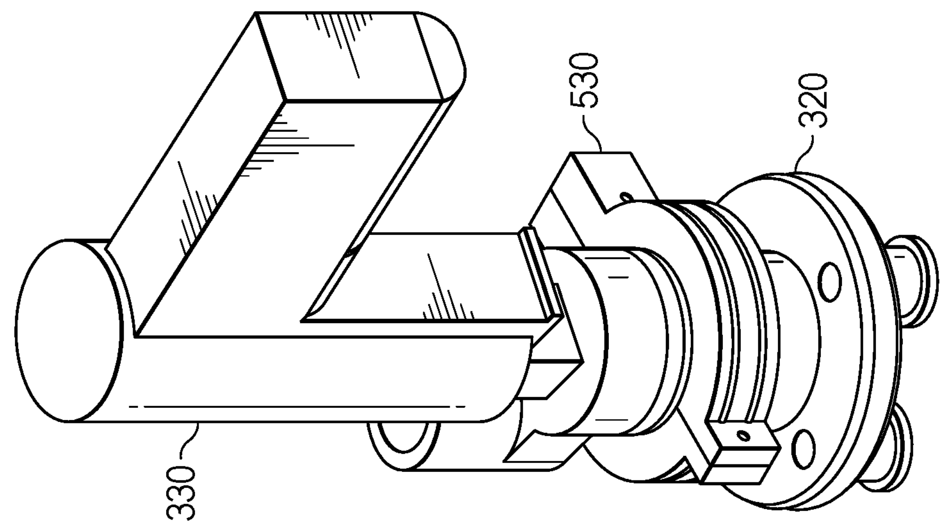

Turning to FIG. 5, in this embodiment first string pot potentiometer 510 is coupled to a collar 530 with a first tension line not shown in FIG. 5. A second string pot potentiometer 520 is coupled to the collar 530 with a second tension line also not shown in FIG. 5. The first string pot potentiometer 510 is orthogonally oriented in a plane with regard to the second string pot potentiometer 520 in order to provide XY coordinates in a plane based on movement of collar 530 relative to the surface.

Figure 6:
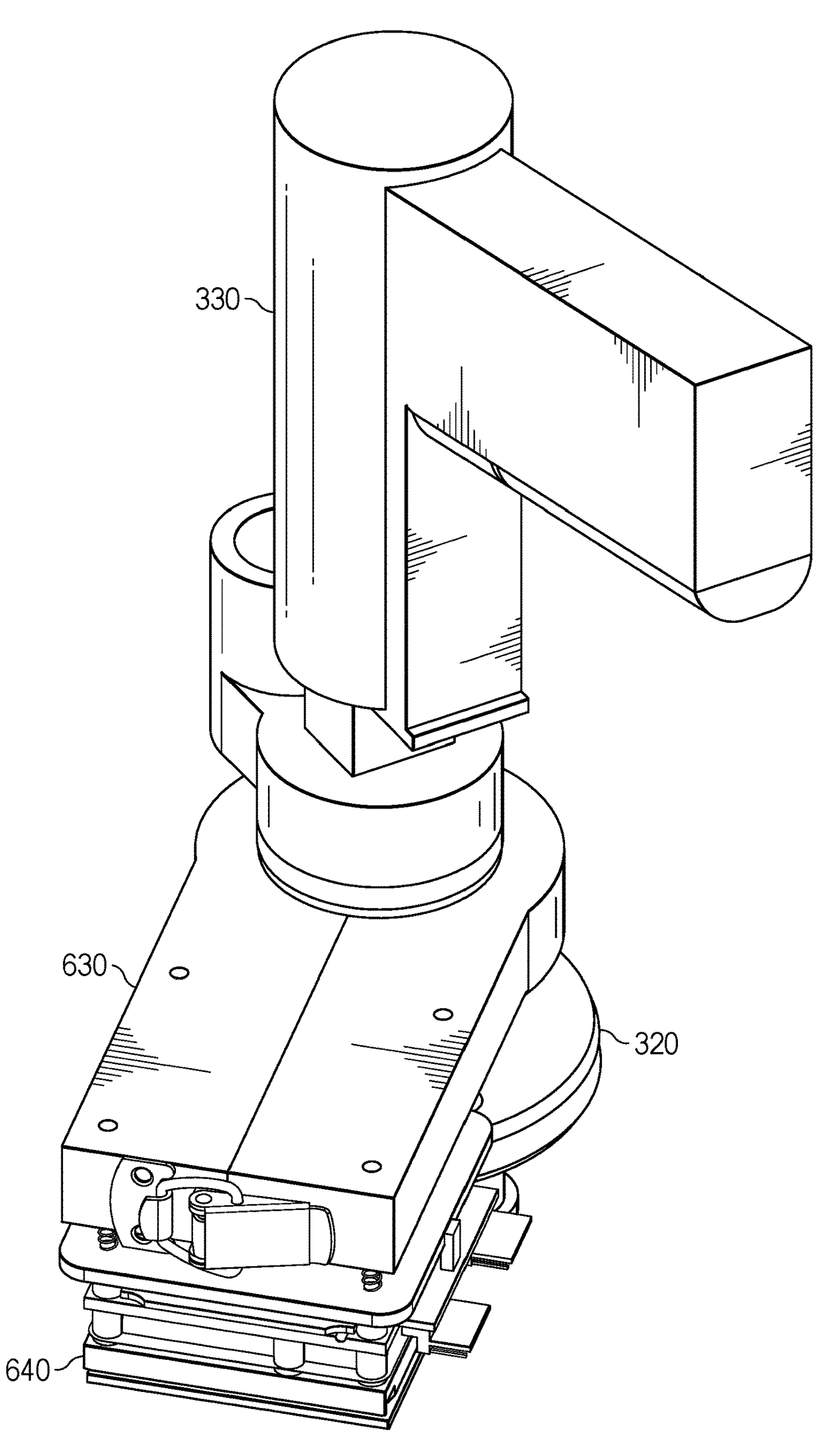
FIG. 6 is an illustration of a portion of the operator assist tool cart together with a rollerball that provides scalar displacement data in accordance with an illustrative embodiment.

Turning to FIG. 6, in this embodiment an alternative collar 630 is coupled to adapter 320. A trackball sensor 640 is coupled to the alternative collar 630. The trackball sensor 640 can include a spring to provide a restorative force to the ball helping to keep the ball in contact with the surface in order to provide XY coordinates in a plane based on movement of alternative collar 630 relative to the surface.

Figure 7A:
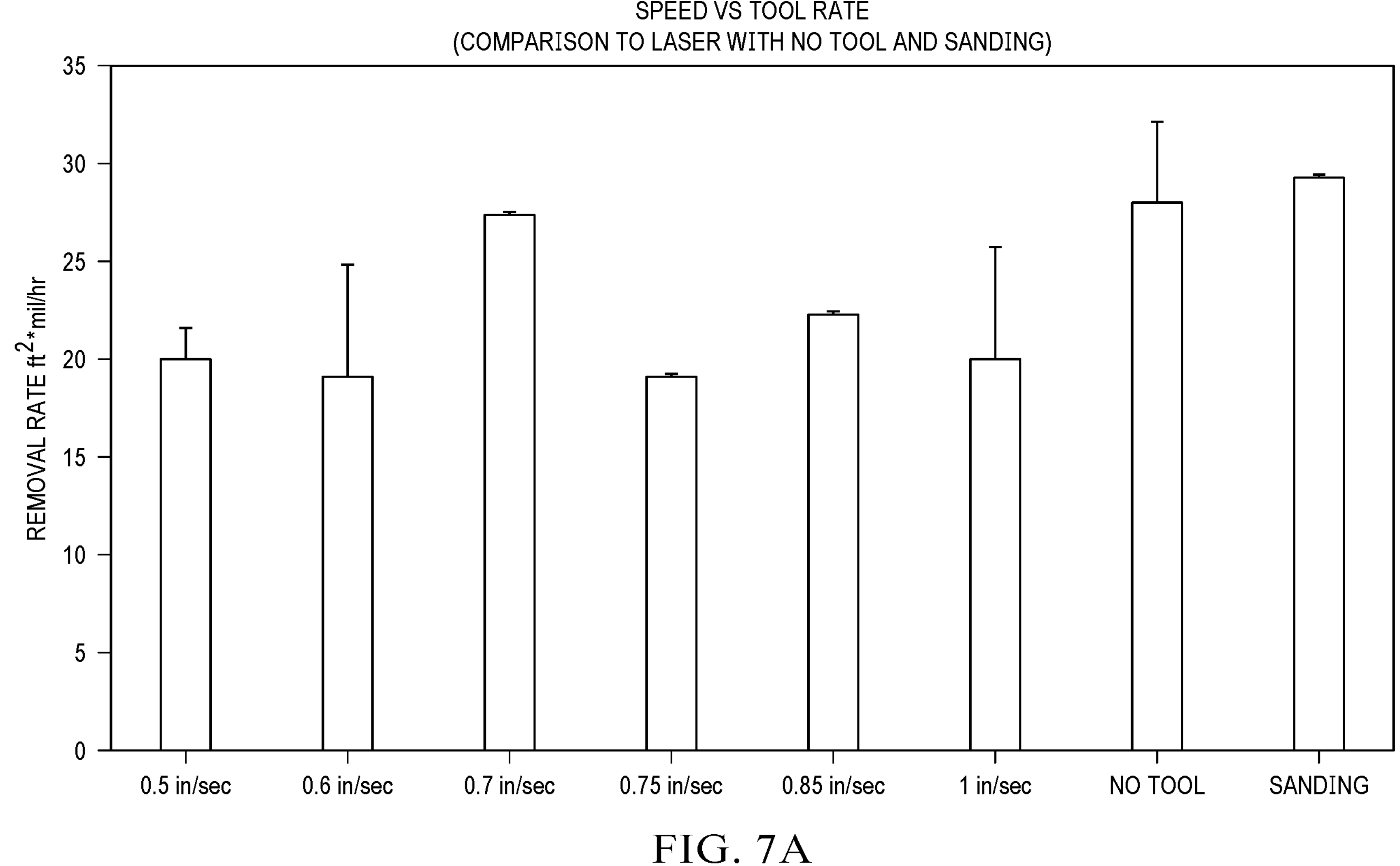
FIG. 7A is an illustration of removal of polyurethane paint from flat aluminum alloy results in units of $ft^2$*mil/hr in accordance with an illustrative embodiment.
Figure 7B:
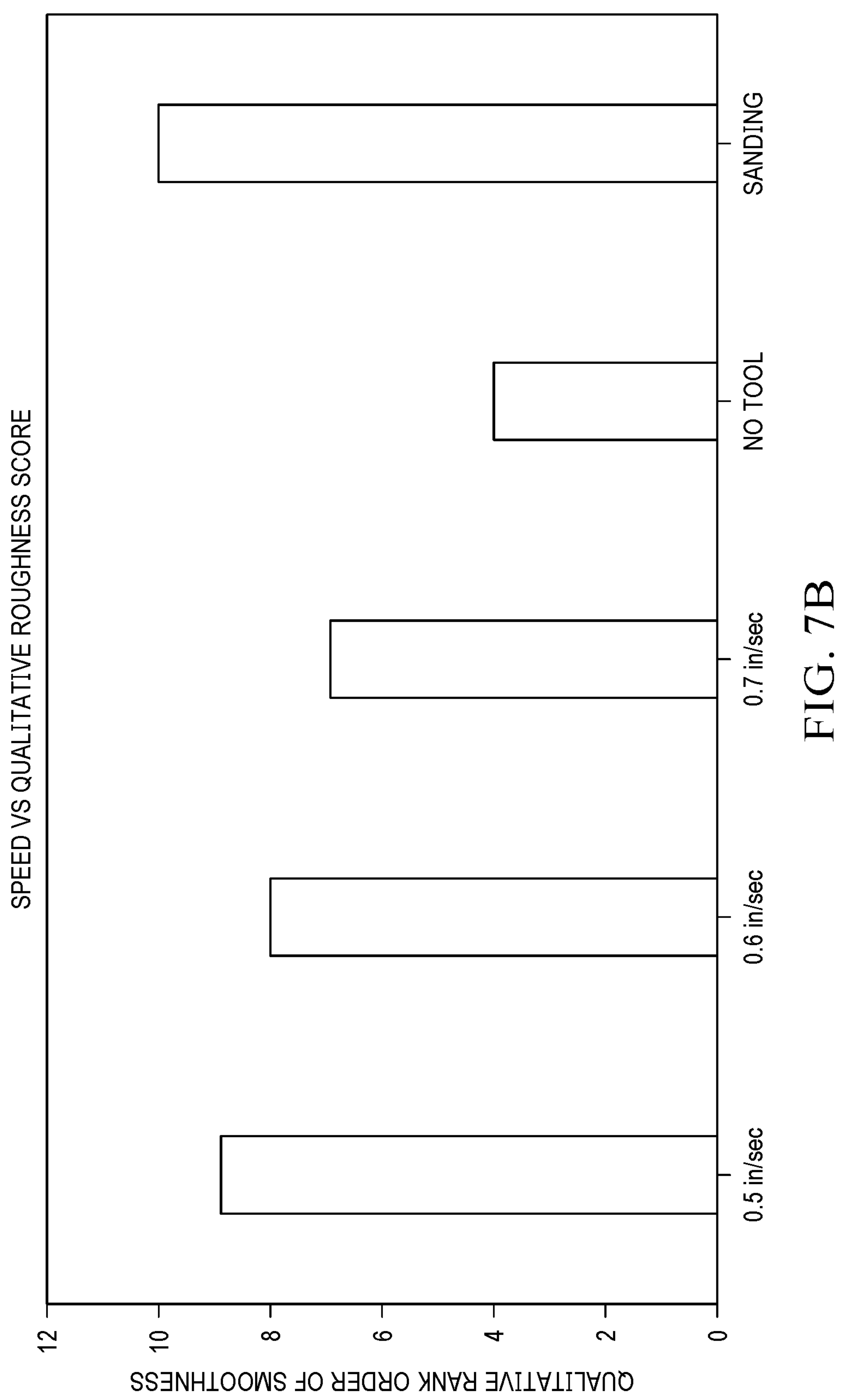
FIG. 7B is an illustration of rank order of smoothness by feel results where 10 is the best (sanding control) and 1 is the roughest by tactile feel in accordance with an illustrative embodiment.

Turning to FIGS. 7A-7B, unexpected advantageous results from an embodiment of this disclosure are presented. These result show consistent, efficient surface ablation enabling efficient and ergonomic ablating process. FIG. 7A, illustrates removal of polyurethane paint from flat aluminum alloy in units of $ft^2$*mil/hr (where a mil is 0.001 inch) for 0.5 inch/second, 0.6 inch/second, 0.7 inch/second, 0.75 inch/second 0.85 inch/second, 1.0 inch/second, no tool, and hand sanding. FIG. 7B, illustrates rank order of smoothness by feel where 10 is the best (sanding control) and 1 is the roughest by tactile feel for 0.5 inch/second, 0.6 inch/second, 0.7 inch/second, no tool, and hand sanding.

As used herein, the phrase at least one of, when used with a list of items, means different combinations of one or more of the listed items may be used and only one of each item in the list may be needed. For example, at least one of item A, item B, or item C may include, without limitation, item A, item A and item B, or item B. This example also may include item A, item B, and item C or item B and item C. Of course, any combinations of these items may be present. In other examples, at least one of may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required. As used herein, a number of, when used with reference to items means one or more items.

The flowchart and block diagram in the different depicted embodiments illustrate the architecture, functionality, and operation of some possible implementations of apparatuses and methods in illustrative embodiments. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional.

Figure 8A:
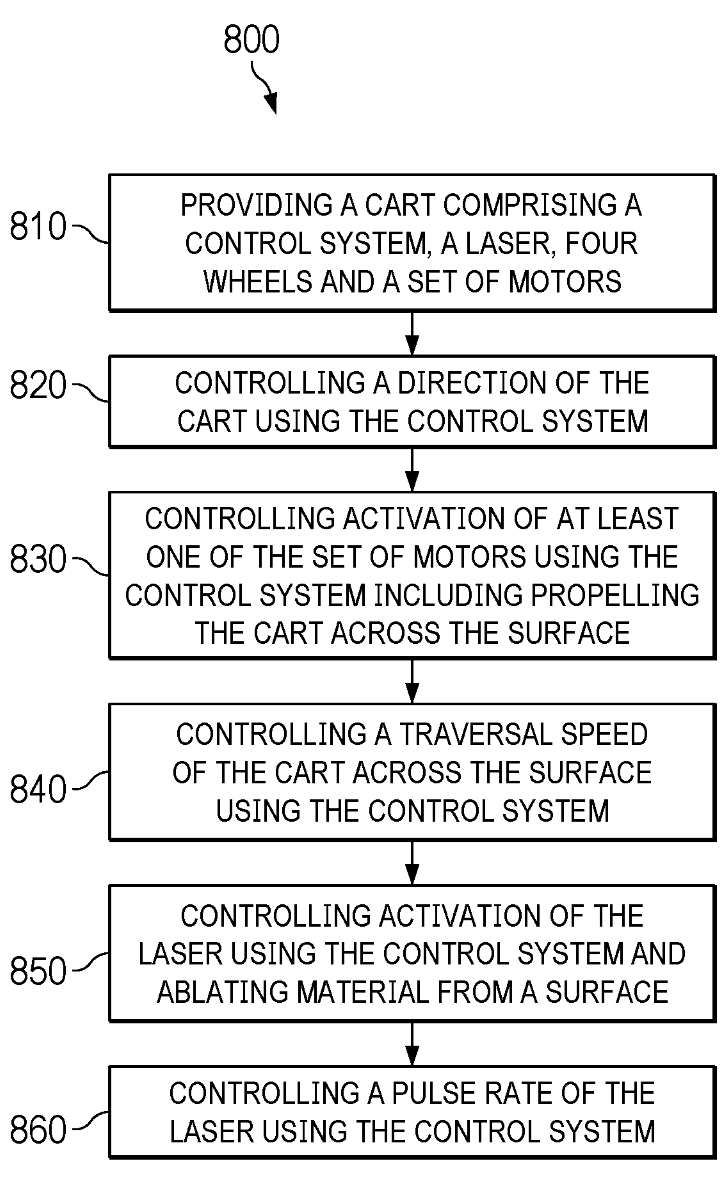
FIG. 8A is a flowchart of a method of deploying an operator assist cart in accordance with an illustrative embodiment.

Turning to FIG. 8A, embodiment of this specification can include a method of deploying an operator an assist tool cart 800. Block 810 includes providing a cart comprising a control system, a laser, four wheels and a set of motors. Block 820 includes controlling a direction of the cart using the control system. Block 830 includes controlling activation of at least one of the set of motors using the control system including propelling the cart across the surface. Block 840 includes controlling a traversal speed of the cart across the surface using the control system. In this embodiment, block 850 is optional and includes controlling activation of the laser using the control system and ablating material from a surface. In this embodiment, block 860 is optional and includes controlling a pulse rate of the laser using the control system.

Figure 8B:
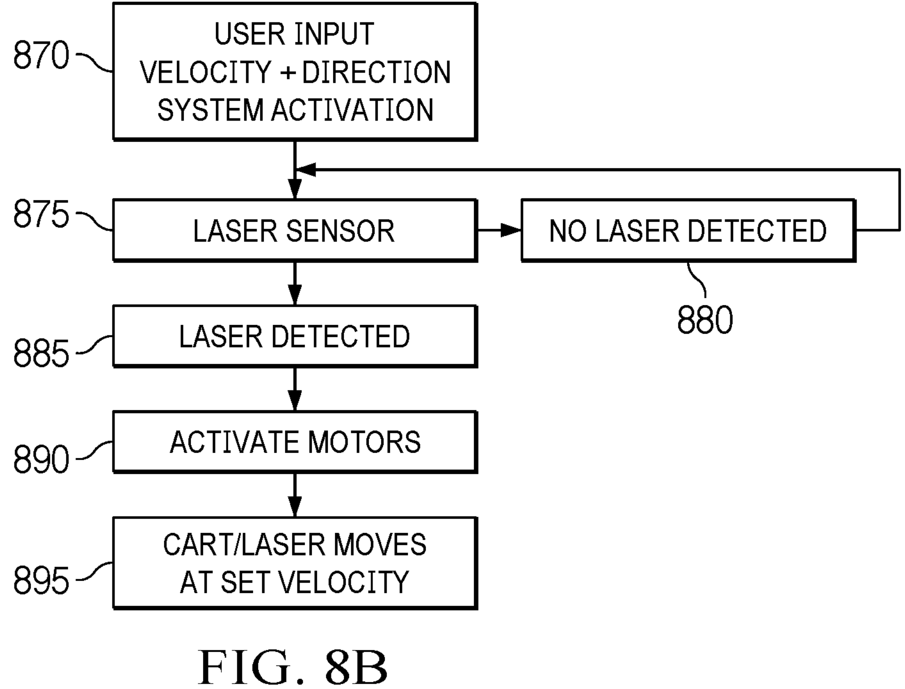
FIG. 8B is a flowchart of a method of controlling a handheld laser operator assist tool in accordance with an illustrative embodiment.

Turning to FIG. 8B, an embodiment of this specification can include a method of controlling a handheld laser operator assist tool. Block 870 includes user input including velocity, direction, and system activation. Block 875 includes a laser sensor output. Block 880 includes looping back if there is no laser detected. Block 885 includes proceeding to the next block when laser is detected. Block 890 includes activating at least one of the set of motors. Block 895 includes the cart/laser moving at a set velocity.

Practical Applications

A practical application of an embodiment of the present disclosure that has value within the technological arts is laser ablation. In particular, laser ablating polyurethane based paint from aluminum alloy, carbon fiber composite and/or glass fiber composite aircraft structural skins.

An embodiment of the present disclosure is useful in conjunction with otherwise handheld printing operations. The cart can be adapted to carry a handheld print head for large-scale printing tasks, ensuring uniform print quality over large surfaces.

An embodiment of the present disclosure is useful in as a semi-automated cutting tool carrier. By attaching various cutting tools, the cart can be used in semi-automated cutting operations, ideal for materials that require consistent speed for precise cuts.

An embodiment of the present disclosure is useful in conjunction with surface cleaning and treatment. For tasks requiring steady motion over surfaces, like scrubbing or chemical treatment, the cart can ensure even application and treatment effectiveness.

An embodiment of the present disclosure is useful in conjunction with agricultural applications. The cart could be adapted to carry small-scale spraying equipment for uniform distribution of pesticides or fertilizers in greenhouse environments.

An embodiment of the present disclosure is useful as an educational tool for robotics and automation training. Given its simple yet effective design, the cart can serve as an educational tool in workshops or institutions teaching robotics and automation principles.

An embodiment of the present disclosure is useful in conjunction with photography and filmmaking. The cart can be adapted for steady and consistent camera movements, ideal for time-lapse photography or smooth panning shots in filmmaking.

An embodiment of the present disclosure is useful in conjunction with scientific and laboratory equipment transport. In laboratory settings, the cart could be used to transport equipment or specimens at a steady pace.

An embodiment of the present disclosure is useful in conjunction with artistic applications. Artists working on large canvases or murals could use the cart to hold paintbrushes or airbrushes.

An embodiment of the present disclosure is useful in conjunction with surface polishing and treatment. For tasks like polishing floors or treating surfaces with chemicals, the cart's consistent speed ensures an even application.

An embodiment of the present disclosure is useful in conjunction with automated guided vehicles (AGVs) in warehouses and other contexts. In warehouse operations, the cart could be adapted as a mini AGV.

An embodiment of the present disclosure is useful in conjunction with medical and rehabilitation devices. For physical therapy and rehabilitation exercises, the cart could be used to move therapeutic devices consistently.

An embodiment of the present disclosure is useful in conjunction with automated gardening tools. The cart can be used in gardening for tasks like seeding, watering, or weeding.

An embodiment of the present disclosure is useful in conjunction with educational demonstrations in physics. In educational settings, the cart could be used to demonstrate principles of motion and dynamics.

An embodiment of the present disclosure is useful in conjunction with otherwise Precision Cleaning in Sensitive Environments: In environments like cleanrooms, the cart could carry cleaning equipment.

An embodiment of the present disclosure is useful in conjunction with culinary applications. In large-scale food preparation or catering, the cart could assist in tasks like decorating cakes or applying glazes and sauces. There are virtually innumerable uses for embodiments of the present disclosure, all of which need not be detailed here.

Figure 9:
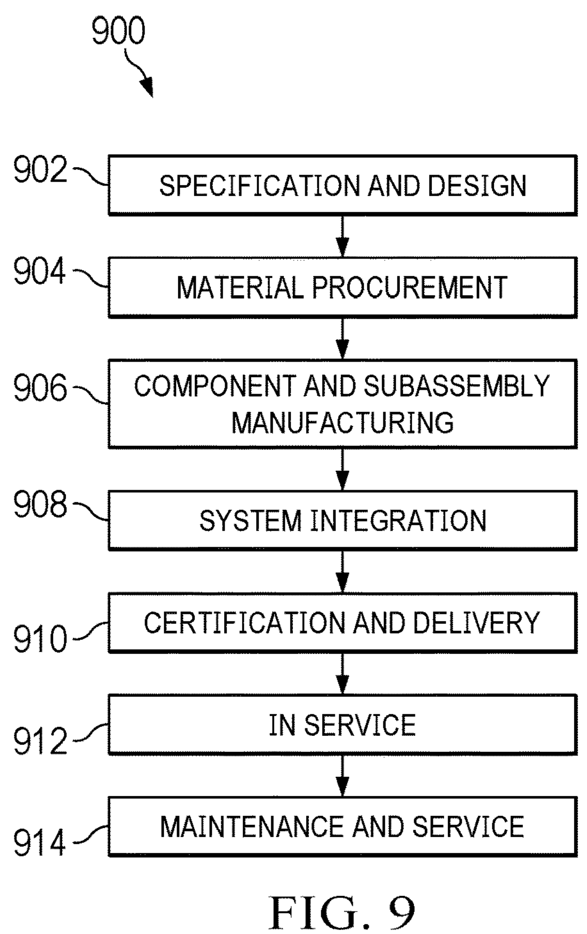
FIG. 9 is an illustration of an aircraft manufacturing and service method in a form of a block diagram in accordance with an illustrative embodiment.
Figure 10:
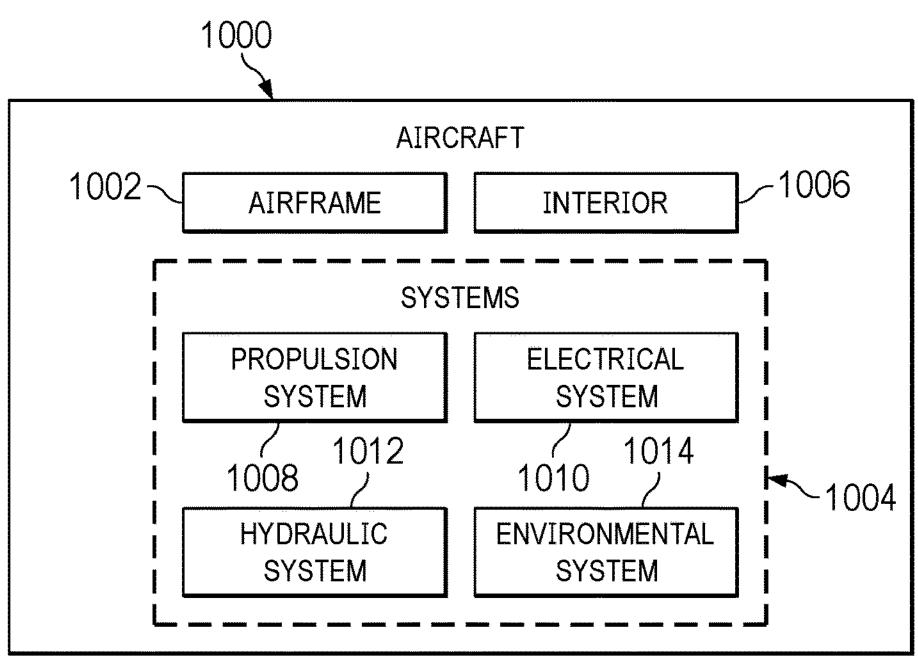
FIG. 10 is an illustration of an aircraft in a form of a block diagram in which an illustrative embodiment may be implemented.

Illustrative embodiments of the present disclosure may be described in the context of aircraft manufacturing and service method 900 as shown in FIG. 9 and aircraft 1000 as shown in FIG. 10. Turning first to FIG. 9, an illustration of an aircraft manufacturing and service method in the form of a block diagram is depicted in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 takes place. Thereafter, aircraft 1000 may go through certification and delivery 910 in order to be placed in service 912. While in service 912 by a customer, aircraft 1000 is scheduled for routine maintenance and service 914, which may include modification, reconfiguration, refurbishment, or other maintenance and service.

Each of the processes of aircraft manufacturing and service method 900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of an aircraft in a form of a block diagram is depicted in which an illustrative embodiment may be implemented. In this example, aircraft 1000 is produced by aircraft manufacturing and service method 900 of FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included.

Apparatuses and methods embodied herein may be employed during at least one of the stages of aircraft manufacturing and service method 900. One or more illustrative embodiments may be manufactured or used during at least one of component and subassembly manufacturing 906, system integration 908, in service 912, or maintenance and service 914 of FIG. 9.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method, comprising:

providing a cart comprising a control system, at least three wheels and a set of motors connected to the at least three wheels, the at least three wheels configured to contact a surface, the set of motors configured to rotate at least one of the at least three wheels and propel the cart across the surface, the cart having variable propulsion speed options;

controlling a direction of the cart using the control system;

controlling activation of at least one of the set of motors using the control system comprising propelling the cart across the surface;

controlling and maintaining a consistent traversal speed of the cart across the surface using the control system;

providing a handheld laser mounted on an adapter, the adapter mounted on top of a base of the cart; and controlling activation of the handheld laser to affect the surface.

2. The method of claim 1, wherein the cart is formed using 3D printing technology.

3. The method of claim 1, wherein controlling activation comprises ablating material from the surface.

4. The method of claim 3, further comprising controlling a pulse rate of the handheld laser using the control system.

5. An aircraft structural component made using the method of claim 1.

6. A method, comprising:

providing a cart comprising a control system, a handheld laser mounted on an adapter and the adapter mounted on top of a base of the cart, four wheels and a set of motors connected to the four wheels, the four wheels configured to contact a surface, the set of motors configured to rotate at least one of the four wheels and propel the cart across the surface, the cart having variable propulsion speed options;

controlling a direction of the cart using the control system;

controlling activation of at least one of the set of motors using the control system comprising propelling the cart across the surface; and controlling and maintaining a consistent traversal speed of the cart across the surface using the control system.

7. The method of claim 6, further comprising activating the handheld laser.

8. The method of claim 7, further comprising controlling activating the handheld laser using the control system.

9. The method of claim 7, further comprising controlling a pulse rate of the handheld laser using the control system.

10. An aircraft structural component made using the method of claim 6.

11. An apparatus, comprising:

a cart comprising at least three wheels and a set of motors connected to the at least three wheels, the at least three wheels configured to contact a surface, the set of motors configured to rotate at least one of the at least three wheels and propel the cart across the surface, the cart having variable propulsion speed options;

a handheld laser mounted on an adapter, the adapter mounted on top of a base of the cart, the handheld laser configured to affect the surface; and a control system coupled to the cart, wherein the control system controls a cart direction, activation of at least one of the set of motors, and maintains a consistent cart speed relative to the surface.

12. The apparatus of claim 11, further comprising a first string pot potentiometer coupled to a collar of the cart and a second string pot potentiometer coupled to the collar of the cart, wherein the first string pot potentiometer and the second string pot potentiometer provide scalar displacement data to the control system.

13. The apparatus of claim 11, further comprising a rollerball coupled to the cart, the rollerball configured to contact the surface, wherein the rollerball provides scalar displacement data to the control system.

14. The apparatus of claim 13, further comprising a restoring force mechanism coupled to both the rollerball and the cart, the restoring force mechanism configured to maintain contact between the rollerball and the surface.

15. The apparatus of claim 11, further comprising an optical sensor coupled to the cart, the optical sensor configured to sense movement of the cart relative to the surface and provide scalar displacement data to the control system.

16. The apparatus of claim 11, wherein the set of motors comprises at least one stepper motor, and further comprising a drive mechanism coupled between the at least one stepper motor and two of the at least three wheels.

17. The apparatus of claim 11, wherein the control system comprises a user interface panel.

18. The apparatus of claim 12, wherein the first string pot potentiometer is orthogonally oriented in a plane with regard to the second string pot potentiometer in order to provide XY coordinates in the plane based on movement of collar relative to the surface.

19. The apparatus of claim 11, wherein the set of motors comprises at least one stepper motor, and further comprising a drive mechanism coupled between the at least one stepper motor and two of the at least three wheels, wherein the control system comprises a user interface panel.

20. An aircraft structural component made by the apparatus of claim 11.

* * * * *